US008163051B2

(12) United States Patent
Yun et al.

(10) Patent No.: US 8,163,051 B2
(45) Date of Patent: Apr. 24, 2012

(54) DUST COLLECTOR OF VACUUM CLEANER

(75) Inventors: Chang Ho Yun, Changwon-si (KR); Gun Ho Ha, Busan (KR); Jin Young Kim, Busan (KR); Chang Hoon Lee, Changwon-si (KR); Jin Wook Seo, Busan (KR); Hyuk Min Kwon, Changwon (KR)

(73) Assignee: LG Electronics Inc., Seoul (KR)

( * ) Notice: Subject to any disclaimer, the term of this patent is extended or adjusted under 35 U.S.C. 154(b) by 909 days.

(21) Appl. No.: 11/965,097

(22) Filed: Dec. 27, 2007

(65) Prior Publication Data

US 2008/0172993 A1 Jul. 24, 2008

(30) Foreign Application Priority Data

Jan. 24, 2007 (KR) ........................ 10-2007-0007358
Jan. 24, 2007 (KR) ........................ 10-2007-0007360

(51) Int. Cl.
*B01D 45/12* (2006.01)

(52) U.S. Cl. ................ 55/337; 15/352; 15/353; 55/428; 55/429; 55/432; 55/459.4; 55/466; 55/DIG. 3

(58) Field of Classification Search .................... 55/343, 55/346, 428, 429, 430, 490, DIG. 3, 337, 55/432, 459.1, 466; 15/352, 353
See application file for complete search history.

(56) References Cited

U.S. PATENT DOCUMENTS 4,172,710 A * 10/1979 van der Molen ................ 55/340
5,350,432 A * 9/1994 Lee ................................ 55/408
6,524,358 B2 * 2/2003 Yang .............................. 55/337
6,579,334 B2 * 6/2003 Oh et al. ......................... 55/426
6,625,845 B2 * 9/2003 Matsumoto et al. ............ 15/353
6,782,583 B2 * 8/2004 Oh ................................. 15/350
6,968,595 B2 * 11/2005 Oh et al. ......................... 15/339
7,086,119 B2 8/2006 Go et al.
7,581,286 B2 * 9/2009 Choi .............................. 15/352
2002/0043055 A1 4/2002 Conrad
2005/0198765 A1 * 9/2005 Jung et al. .................... 15/327.1
2005/0198770 A1 9/2005 Jung et al.
2006/0123749 A1 6/2006 Park
2006/0137304 A1 6/2006 Jeong et al.

FOREIGN PATENT DOCUMENTS

CN 2453827 10/2001
CN 1605315 4/2005
CN 1777385 5/2006
EP 1 671 570 6/2006

(Continued)

OTHER PUBLICATIONS

Chinese Office Action dated Dec. 18, 2009.

(Continued)

*Primary Examiner* — Duane Smith
*Assistant Examiner* — Sonji Turner
(74) *Attorney, Agent, or Firm* — KED & Associates LLP

(57) ABSTRACT

A dust collector of a vacuum cleaner is provided. The dust collector includes a dust separation part that separates dust from air, a dust collecting body having a dust storage part that stores the dust separated by the dust separation part, and a division part that closes an inner space of the dust separation part and includes an opening through which the dust is discharged into the dust storage part.

17 Claims, 11 Drawing Sheets

FOREIGN PATENT DOCUMENTS

| | | |
|---|---|---|
| EP | 1 181 886 | 12/2009 |
| KR | 10-2002-0060379 | 7/2002 |
| RU | 2226433 | 4/2004 |
| RU | 2255643 | 7/2005 |
| RU | 2311110 | 11/2007 |

OTHER PUBLICATIONS

European Search Report dated Dec. 29, 2010. (Application No. 07024639.2-2316/1949967).

Korean Office Action dated Mar. 25, 2008.

Russian Office Action dated Mar. 30, 2009.

Chinese Office Action dated Jun. 26, 2009.

Australian Office Action dated Jul. 21, 2009.

European Search Report dated Sep. 9, 2010.

* cited by examiner

DUST COLLECTOR OF VACUUM CLEANER

The present application claims priority under 35 U.S.C. 119 and 35 U.S.C. 365 to Korean Patent Application Nos. 10-2007-0007358 and 10-2007-0007360 both filed on Jan. 24, 2007, which are hereby incorporated by reference in their entirety.

BACKGROUND

1. Field

A dust collector of a vacuum cleaner is disclosed herein.

2. Description of the Related Art

In general, a vacuum cleaner is an apparatus that separates dust in a body of the apparatus after inhaling air including dust using vacuum pressure generated by a suction motor in the body. The vacuum cleaner is broadly divided into a canister type having a nozzle unit that inhales air including dust from a space to be cleaned connected to a main body through a connection pipe arranged separate from the main body, and an upright type having a nozzle unit and a main body integrally formed as one piece.

A dust collector mounted on a vacuum cleaner includes a dust container having a dust storage part that stores dust in an inside of the dust container, an air suction pipe that inhales air including dust, a dust separation part that separates the dust from the air inhaled through the air suction pipe, an ejecting hole that exhausts the air inhaled into the dust separation part, and a filter member that filters the dust. The dust separation part and the dust storage part are formed in the inside of an inner space of the dust container divided by a division wall, and the dust ejecting hole is formed at the wall to discharge the dust to the dust storage part.

Reference will now be made briefly to the operation of a dust collector configured as above. When a suction motor is operated, the air including dust is inhaled into the dust container. At this time, the air including the dust passes through a separation process at the dust separation part. Further, the air separated from the dust is exhausted through the dust ejecting hole, and the separated dust is discharged into the dust storage part which is disposed at a lower part of the dust container, through the dust ejecting hole.

According to the conventional dust collector, dust of relatively high density falls through the dust ejecting hole in the dust storage part due to its weight. However, dust of relatively lower density does not fall down through the dust ejecting hole and remains in the dust separation part.

Accordingly, a dust collector capable of moving the separated dust into the dust storage part easily is required. Further, the dust in the air is not removed well as the air is not circulated smoothly, and dust piles up on the filter member when the dust of lower density remains in the dust separation part.

Therefore, a dust collector, for which the filter member is easily exchanged while cleaning of the filter member, as well as that prevents minute dust from piling up on the filter member is required.

SUMMARY

Embodiments of a dust collector of a vacuum cleaner include a dust separation part that separates dust from inhaled air, a dust collecting body that stores the dust separated by the dust separation part, and a division part that divides an inner space of the dust collector into the dust separation part and the dust storage part, and selectively opens and closes the dust separation part, the division part including an opening that discharges the dust into the dust storage part.

BRIEF DESCRIPTION OF THE DRAWINGS

Drawings are provided as follows for a further understanding of embodiments of a dust collector of a vacuum cleaner.

DETAILED DESCRIPTION

Hereinafter, reference will now be made in detail to embodiments of a vacuum cleaner with reference to the accompanying drawings.

Figure 1:
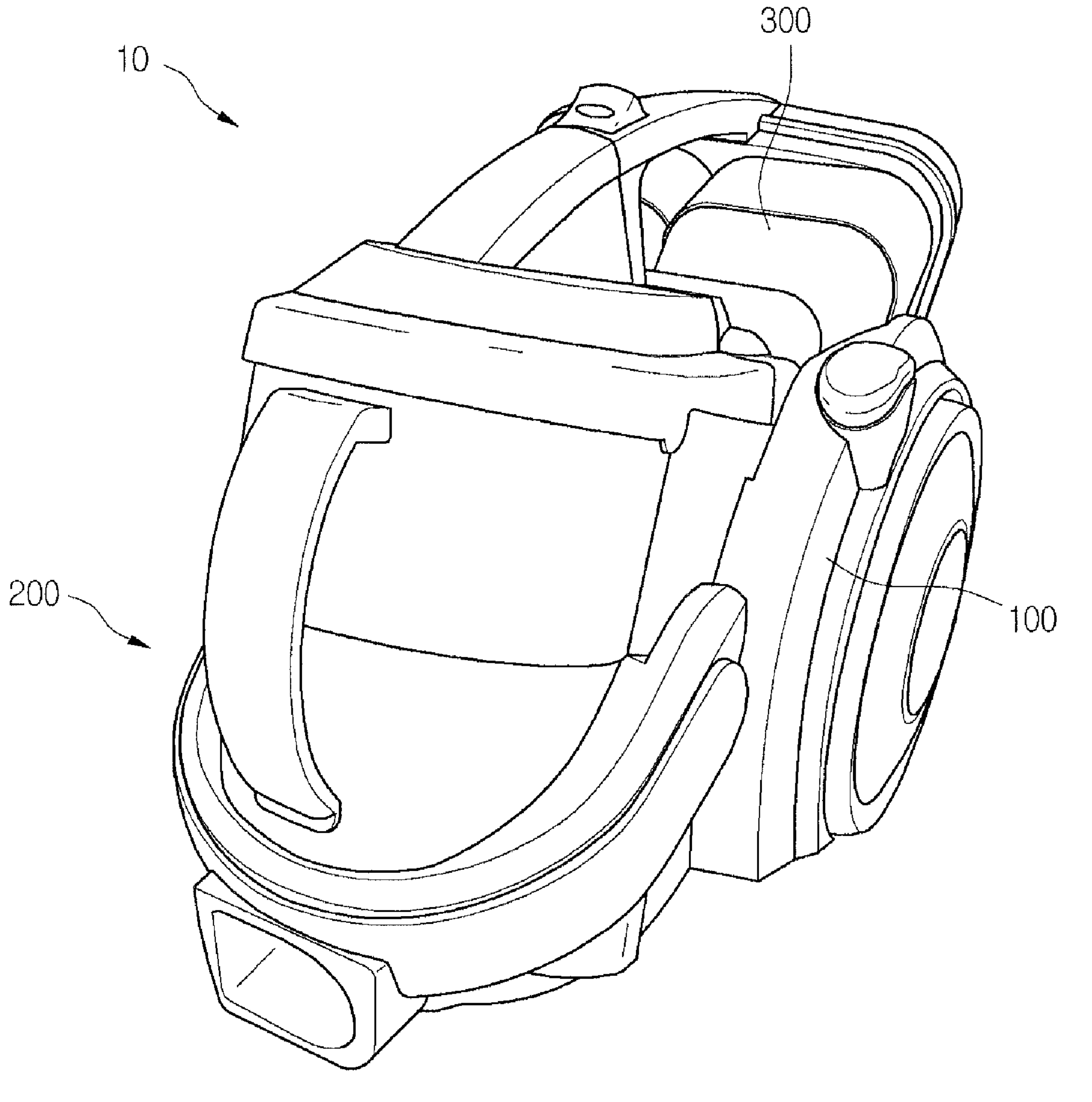
FIG. 1 is a perspective view illustrating a vacuum cleaner.
Figure 2:
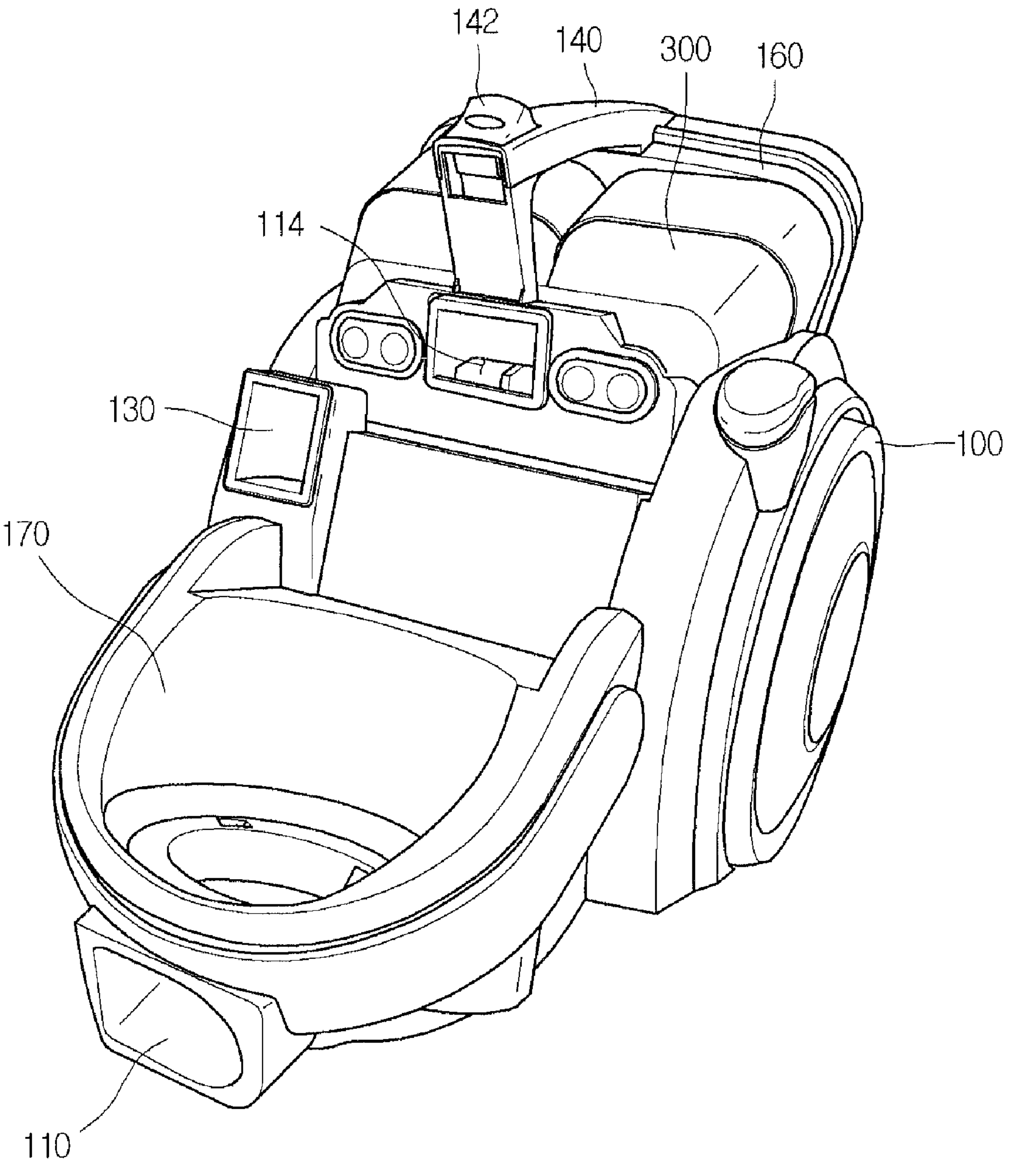
FIG. 2 is a perspective view illustrating a state in which a dust collector is separated from a vacuum cleaner.
Figure 3:
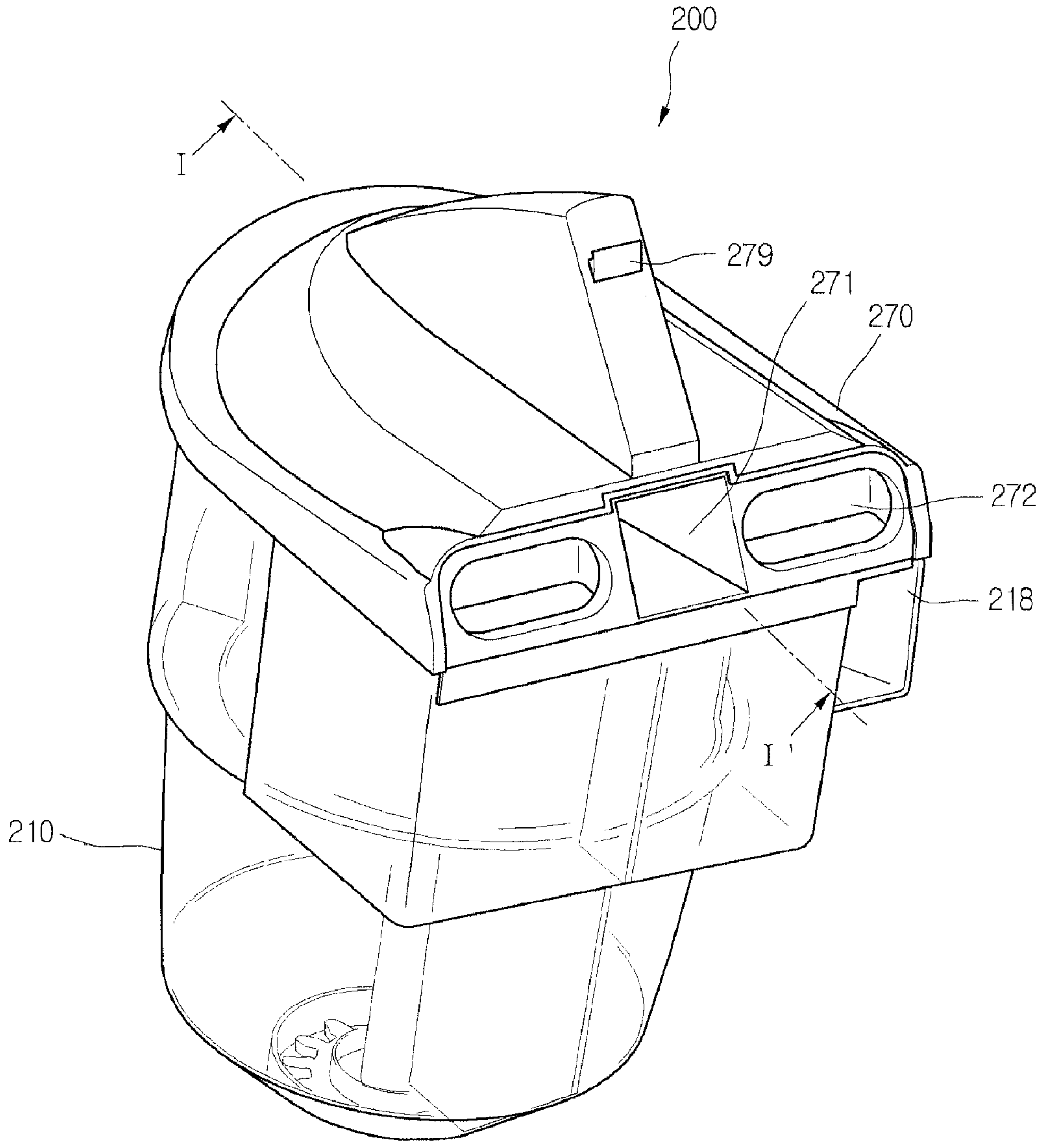
FIG. 3 is a perspective view illustrating the dust collector.

FIG. 1 is a perspective view illustrating a vacuum cleaner, FIG. 2 is a perspective view illustrating a state in which a dust collector is separated from the vacuum cleaner, and FIG. 3 is a perspective view illustrating the dust collector. Referring to FIGS. 1 to 3, the vacuum cleaner 10 includes a main body 100, in which a suction motor that generates suction power is arranged in an inside thereof, and a dust separator that separates dust from air inhaled into the main body 100. The vacuum cleaner 10 further includes a suction nozzle that inhales the air including dust and a connection pipe that connects the suction nozzle with the main body 100, though not illustrated. A detailed description of the basic configuration of the suction nozzle and the connection pipe has been omitted, as it is the same as that of the related art.

More particularly, a main body suction port 110 is formed at a lower end of a front of the main body 100 to inhale the air including the dust through the suction nozzle. A main body discharge port 110 is formed at a side of the main body 100 to exhaust the air from the main body 100 after the dust is removed. A handle 140 is formed on an upper portion of the main body 100 for carrying the main body 100.

The dust separator includes a dust collector 200 having a first cyclone unit, which is illustrated later herein, that separates the dust from the air inhaled into the inside for the first time, and a second cyclone unit 300 arranged in the main body 100 to separate once more dust from the air separated for the first time by the first cyclone unit. More particularly, the dust collector 200 is detachably installed to a front portion of the main body 100.

A removal lever 142 is provided at the handle 140 of the main body 100 to attach and detach the dust collector 200 to and from the main body 100. An engagement end 279 engaged with the removal lever 142 is formed at the dust collector 200.

The dust collector 200 includes the first cyclone unit that generates cyclone movement and a dust collecting body 210 having a dust storage part that stores the dust separated in the first cyclone unit. The dust collector 200 is mounted so as to be attached and removed to and from the main body 100 as described above, and the dust collector 200 communicates with the main body 100 and the second cyclone unit 300, as the dust collector 200 is mounted at the main body 100.

More particularly, an air outlet 130 that exhausts the air inhaled into the main body 100 to the dust collector 200 and a first air inlet 218 that inhales the air from the air outlet 130 are formed in the main body 100 and the dust collector 200, respectively. It is preferable for the first air inlet 218 to be formed in a tangential direction of the dust collector 200 to generate the cyclone movement in the dust collector 200.

A first air outlet 271 that exhausts the air separated from the dust in the first cyclone unit is formed in the dust collector 200, and a connecting path 114 that inhales the air exhausted through the first air outlet 271 is formed at the main body 100. The air inhaled into the connecting path 114 is inhaled into the second cyclone unit 300.

The second cyclone unit 300 includes a plurality of cone-shaped cyclones. The second cyclone unit 300 is arranged so as to lie at an upper side of a rear of the main body 100.

As described above, advantages in space utilization are improved with this arrangement of the vacuum cleaner where miniaturization is required with the suction motor by arranging the second cyclone unit 300 to lie down on the main body 100. Further, the structure of the dust collector 200 is simplified and users can use the dust collector 200 utilizing lower energy as the weight of the dust collector 200 is reduced, as the second cyclone unit 300 is separated from the dust collector 200 and arranged on the main body 100.

The dust separated in the second cyclone unit 300 is stored in the dust collector 200. For this, a dust inlet 272 that inhales the dust separated in the second cyclone unit 300 and a dust storage part that stores the dust separated in the second cyclone unit 300 are further formed in the dust collecting body 210.

The dust storage part formed in the dust collecting body 210 includes a first dust storage part (illustrated later) that stores the dust separated by the first cyclone unit and a second dust storage part (illustrated later) that stores the dust separated by the second cyclone unit 300. That is, the second cyclone unit 300 is disposed in the main body 100 separate from the dust collector 200, but the dust separated in the second cyclone unit 300 is stored in the dust collector 200 in the present embodiment.

Reference will now be made in detail to operation of the vacuum cleaner 10 in accordance with the above-mentioned configuration.

When the main body 100 is operated by applying power to the vacuum cleaner 10, suction power is generated by the suction motor arranged in the main body 100. Then, air including dust is inhaled by the suction power of the suction motor through the suction nozzle into the dust collector 200 through the connection pipe and a predetermined path formed in the main body 100.

When the air including dust is inhaled into the dust collector 200, the inhaled air is separated from the dust by means of the first cyclone unit for the first time. Then, the separated dust is stored in the dust collecting body 210. The air separated from the dust by the first cyclone unit is inhaled into the main body 100 as it is discharged from the dust collector 200, and then inhaled into the second cyclone unit 300 through the connecting path 114 arranged in the main body 100.

The air inhaled into the second cyclone unit 300 is separated from the dust once more, and the separated dust is inhaled into the dust collector 200 and stored in there. Thereafter, the air separated from the dust by the second cyclone unit 300 is exhausted to an outside through the main body outlet port after flowing through a predetermined path in the main body 100.

Reference will now be made in detail to the configuration of the dust collector.

Figure 4:
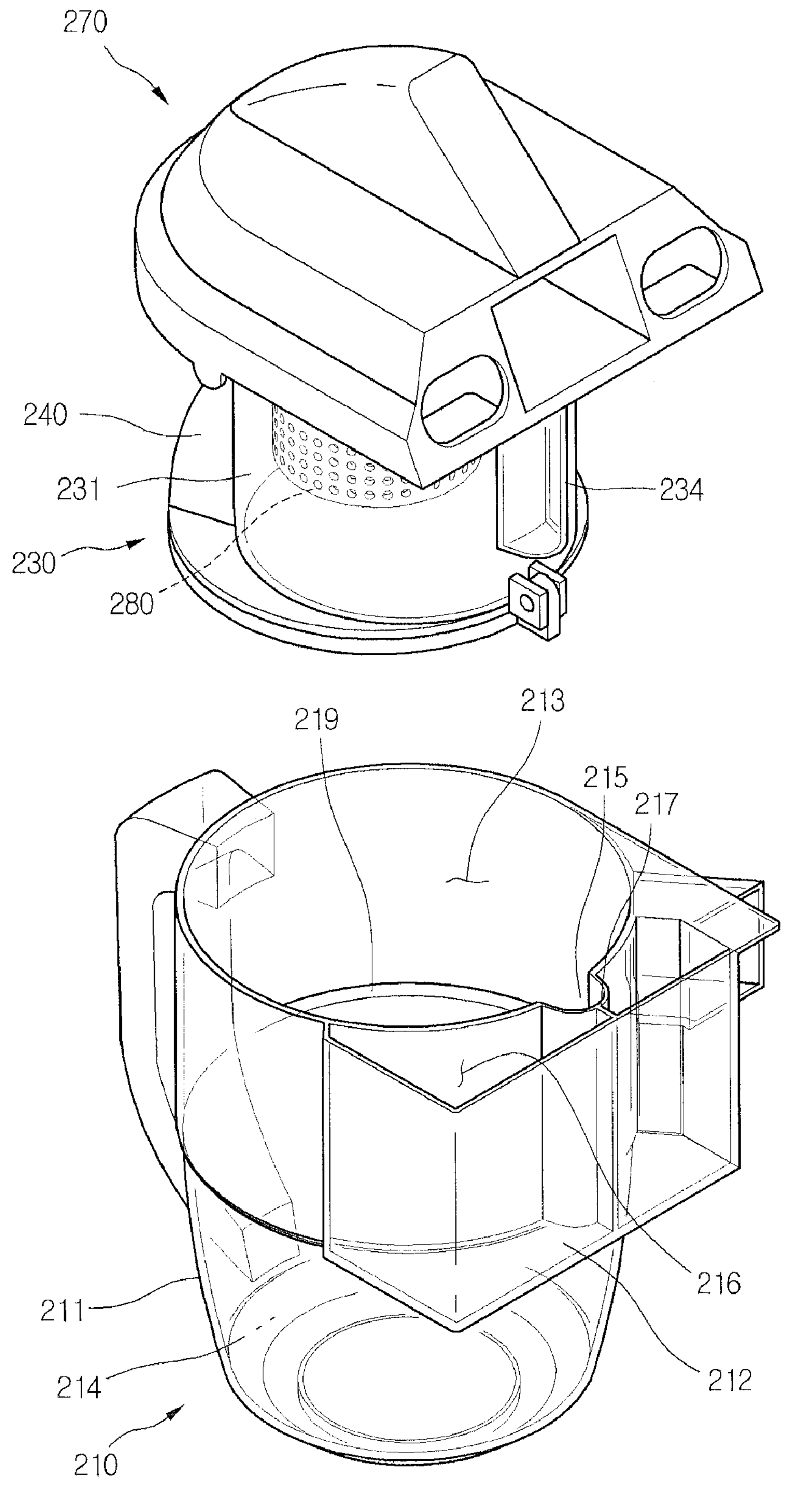
FIG. 4 is a disassembled perspective view of the dust collector.

FIG. 4 is a disassembled perspective view of a dust collector.

Referring to FIG. 4, the dust collector 200 includes a dust collecting body 210 that forms an external appearance of the dust collector 200, a dust separation part 230 accommodated in the dust collecting body 210, selectively, and provided with a first cyclone unit 231 that separates dust from the inhaled air for the first time and a cover member 270 that opens and closes an upper part of the dust collecting body 210, selectively.

More particularly, the dust collecting body 210 is formed in a nearly rounded shape and has a dust storage part that stores the separated dust.

The dust storage part includes a first dust storage part 214 that stores the dust separated in the first cyclone unit 231 and a second dust storage part 216 that stores the dust separated in the second cyclone unit 300. The dust collecting body 210 includes a first wall 211 that forms the first dust storage part 214, and a second wall 212 that forms the second dust storage part 216 in relation to the first wall 211. That is, the second wall 212 covers a predetermined part of an outer side of the first wall 211. Therefore, the second dust storage part 216 is formed at an outer side of the first dust storage part 214. Thus, a dust collecting capacity of the first dust storage part 214 is maximized by arranging the second dust storage part 216 at the outer side of the first dust storage part 214.

A bent portion 219 that supports a lower end of the dust separation part 230 is formed at the first wall 211 of the dust collecting body 210. Therefore, the dust collector 200 is divided into an accommodation part 213, in which a dust separation part 230 is accommodated, and a first dust storage part 214. The accommodation part 213 has a diameter bigger than that of the first dust storage part 214.

A strength reinforcing rib 217 is formed at the second dust storage part 216 to strengthen the second wall 212 forming the second dust storage part 216. That is, the strength reinforcing rib 217 prevents movement of the second wall 212 toward the first wall 211 when the vacuum pressure is generated by the suction motor. The strength reinforcing rib 217 is formed integral with the first wall 211 and the second wall 212. Therefore, the second dust storage part 216 is divided into at least two spaces by the strength reinforcing rib 217.

The dust separation part 230 is put into the dust collecting body 210 as described above. Further, the dust separation part 230 includes the first cyclone unit 231 of cylindrical shape that separates the dust from the inhaled air by operation of the cyclone, and a dust guide path 240 that guides the separated dust to be discharged easily into the first dust storage part 214 easily.

More particularly, the dust guide path 240 guides the separated dust to fall downwardly after flowing in a tangential direction from the first cyclone unit 231. Reference will be made later to the dust guide path 240 with reference to the accompanying drawings.

A first guide part 234 is formed at the first cyclone unit 231 to guide mounting of the dust separation part 230. A second guide part 215 is formed in the dust collecting body 210 corresponding to the first guide part 234.

The first guide part 234 is formed to extend toward a lateral part from the first cyclone unit 231. The cross-section of the first guide part 234 is rounded for a smooth guiding operation.

The second guide part 215 is depressed toward the outside from the first wall 211 of the dust collecting body 210 for the first guide part 234 to be accommodated therein, as the first guide part 234 protrudes from the first cyclone unit 234. Here, the second guide part 215 is depressed toward the second dust storage part 216 and corresponds to the first guide part 234. That is, the second guide part 215 is depressed toward the second wall 212 from the first wall 211, and the cross section of the second guide part 215 is rounded.

A reduction in a sense of beauty is prevented as the second guide part 215 is not exposed outside of the dust collecting body 210, as the second guide part 215 is depressed toward the second dust storage part 216. Further, it is possible for a dust storing space in the second dust storage part 216 to be secured, though the second guide part 215 is depressed toward the second dust storage part 216, since the second dust storage part 216 stores minute dust particles of relatively smaller volume. Therefore, a user can put the dust separation part 230 into the dust collecting body 210 easily using the first and second guide parts 215 and 234. Further, the coupling of the cover member 270 coupled with the dust separation part 230 with the dust collecting body 210 is guided as the dust separation part 230 is guided inside the dust collecting body 210.

The dust separation part 230 is detachably fixed to a lower side of the cover member 270. When the dust stored in the dust collecting body 210 is to be discharged, the cover member 270 is separated from the dust separation part 230.

The cover member 270 is detachably coupled at an upper side of the dust collecting body 210. That is, the cover member 270 opens or closes the first dust storage part 214 and the second dust storage part 216 at the same time.

Therefore, the upper side of the dust collecting body 210 is completely opened when a user separates the cover member 270 coupled with the dust separation part 230 from the dust collecting body 210 to discharge the dust stored in the first dust storage part 214 and the second dust storage part 216 to the outside. Further, when the user turns the dust collecting body 210 upside down, the dust is easily emptied from the first and second dust storage parts 214 and 216 of the dust collecting body 210. At this time, re-pollution of the cleaned interior is prevented, as a user separates the cover member 270 from the dust collecting body 210 at the outside or above a trash box to empty the dust collecting body 210. A filter member 280 is coupled with the lower side of the cover member 270 to filter the air exhausted from the first cyclone unit 231.

Reference will now be made in detail to structure of each of the configurations of the dust collector and to functions thereof.

Figure 5:
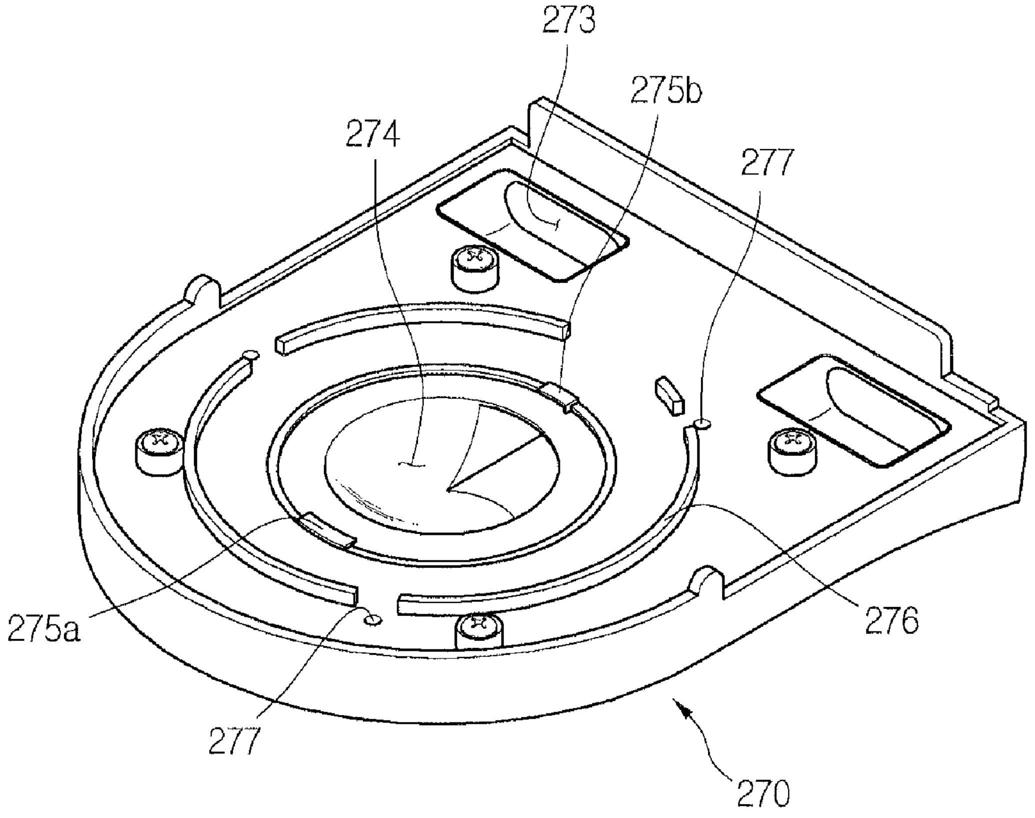
FIG. 5 is a perspective view of a bottom of a cover member.
Figure 6:
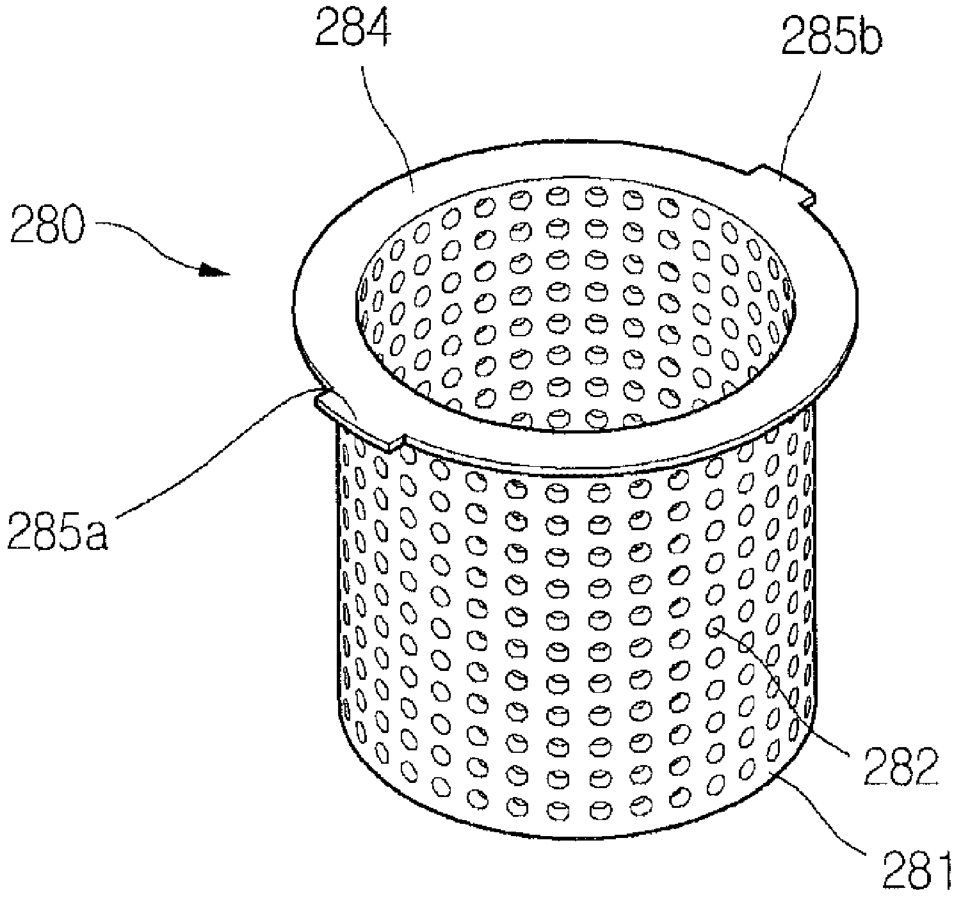
FIG. 6 is a perspective view of a filter member.

FIG. 5 is a perspective view of a bottom of the cover member, and FIG. 6 is a perspective view of a filter member. Referring to FIGS. 5 and 6, an ejecting hole 274 that exhausts the air separated from the dust in the first cyclone unit 231 is penetratingly formed at a center of the bottom of the cover member 270. A filter member 280 is coupled with or to the cover member 270. The filter member 280 has a plurality of holes 282 of a predetermined size on an outer circumferential surface thereof. Thus, the air having passed through the first dust separating process in the first cyclone unit 231 is exhausted through the ejecting hole 274 after passing through the filter member 280.

A plurality of engagement ends are formed around the ejecting hole 274 for engagement of the filter member 280 with the cover member 270. More particularly, the plurality of engagement ends includes a first engagement end 275*a* and a second engagement end 275*b*, which is formed smaller than the first engagement end 275*a*. As the size of the engagement ends 275*a* and 275*b* is different, an engagement location of the filter member 280 is guided. Therefore, the filter member 280 is engaged at an exact location on the cover member 270.

A plurality of coupling guides 276 are formed with predetermined intervals therebetween at a lower side of the cover member 270 to guide the coupling of the dust separation part 230. The plurality of coupling guides 276 wraps a part of a top of the first cyclone unit 231 when the dust separation part 230 is coupled with the cover member 270. Coupling holes 277 are formed for coupling with coupling members at an interval part of the plurality of coupling guides 276.

The filter member 280 includes a filter body 281 of a cylindrical shape, an upper part of which is opened. A plurality of holes 282 are formed at an outer circumferential surface of the filter body 281, and a guide rib 284 is formed at an upper side of the filter body 281 that extends in a horizontal direction to guide the coupling of the filter member 280 with the cover member 270. The guide rib 284 also performs a function of preventing the air discharged through the ejecting hole 274 from leaking into the first cyclone unit 231 through a contact part of the filter member 280 and the cover member 270 at the bottom of the cover member 270 when the filter member 280 is coupled with the cover member 270.

A plurality of coupling ribs is formed at the guide rib 284 to be coupled with the coupling ends 275*a* and 275*b*. More particularly, the plurality of coupling ribs includes a first coupling rib 285*a* that extends in the horizontal direction from the guide rib 284, and a second coupling rib 285*b*, which is smaller than the first coupling rib 285*a*.

A vertical section of each of the first and second engagement ends 275*a* and 275*b* is formed as a "L" shape to be engaged with the first and second coupling ribs 285*a* and 285*b* when rotated. Therefore, the filter member 280 is coupled with the cover member 270 when the first and second coupling ribs 285*a* and 285*b* are rotated a predetermined distance in the clockwise direction in the view of FIG. 5 in a state in which the first and second coupling ribs 285*a* and 285*b* are arranged on the first and second engagement ends 275*a* and 275*b*.

A plurality of dust outlets 273 are formed at a bottom of the cover member 270 to discharge the dust inhaled into the cover member 270 through the dust inlet 272 (shown in FIG. 3) to the second dust storage part 216. It is preferable that at least two dust outlets 273 are formed, as the second dust storage part 216 is divided into at least two spaces by the strength reinforcing rib 217.

Figure 7:
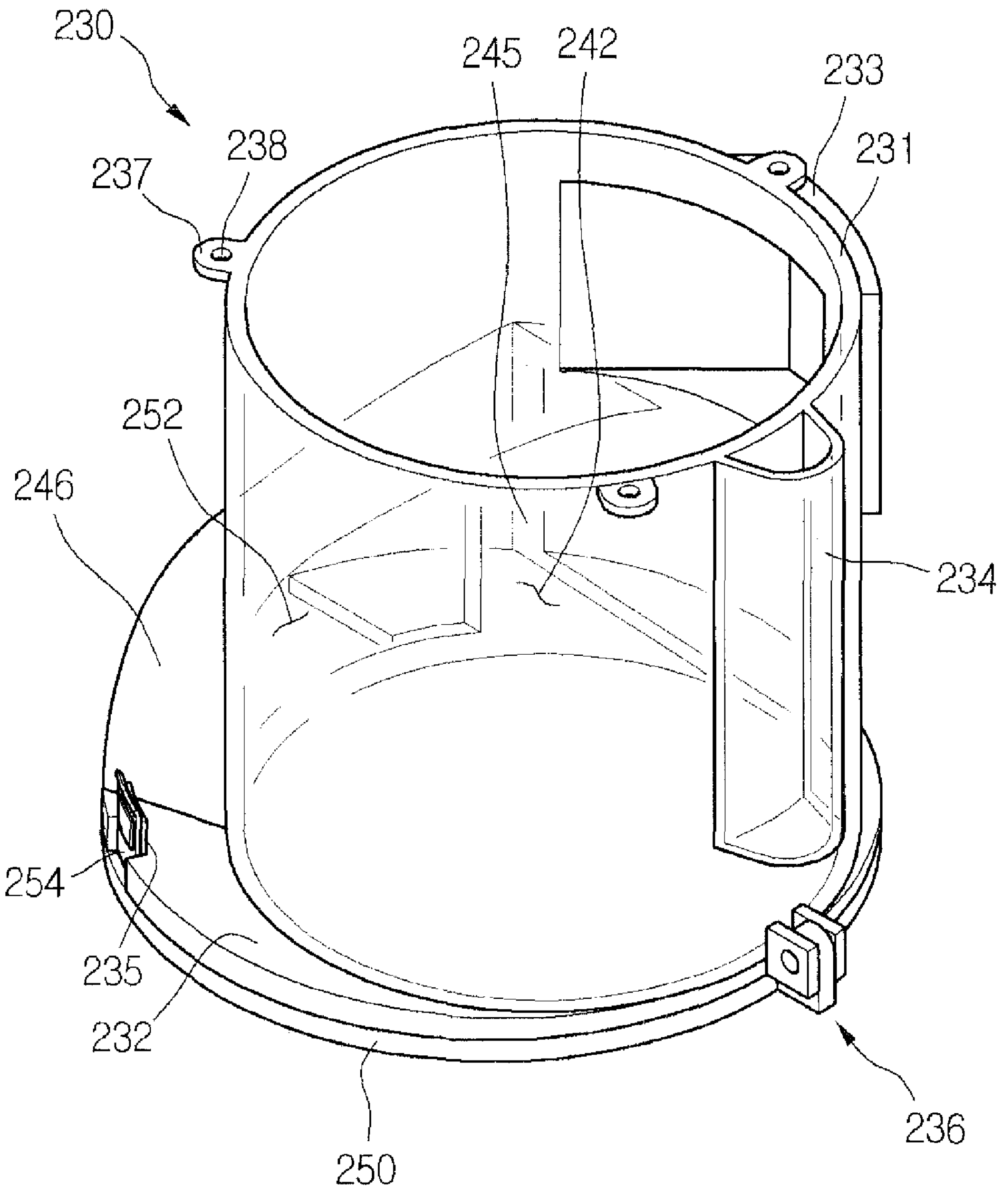
FIGS. 7 and 8 are perspective views of an external appearance of a dust separation part.
Figure 8:
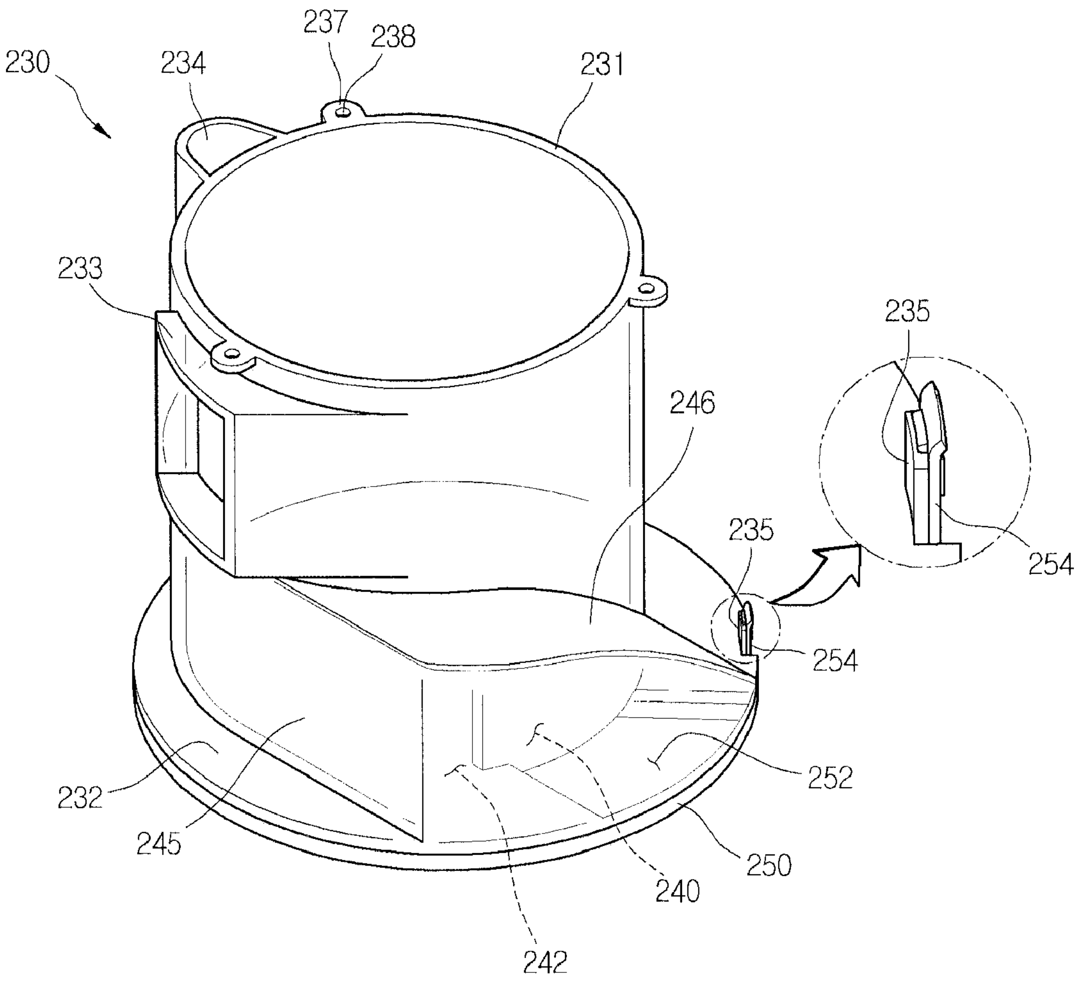
Figure 9:
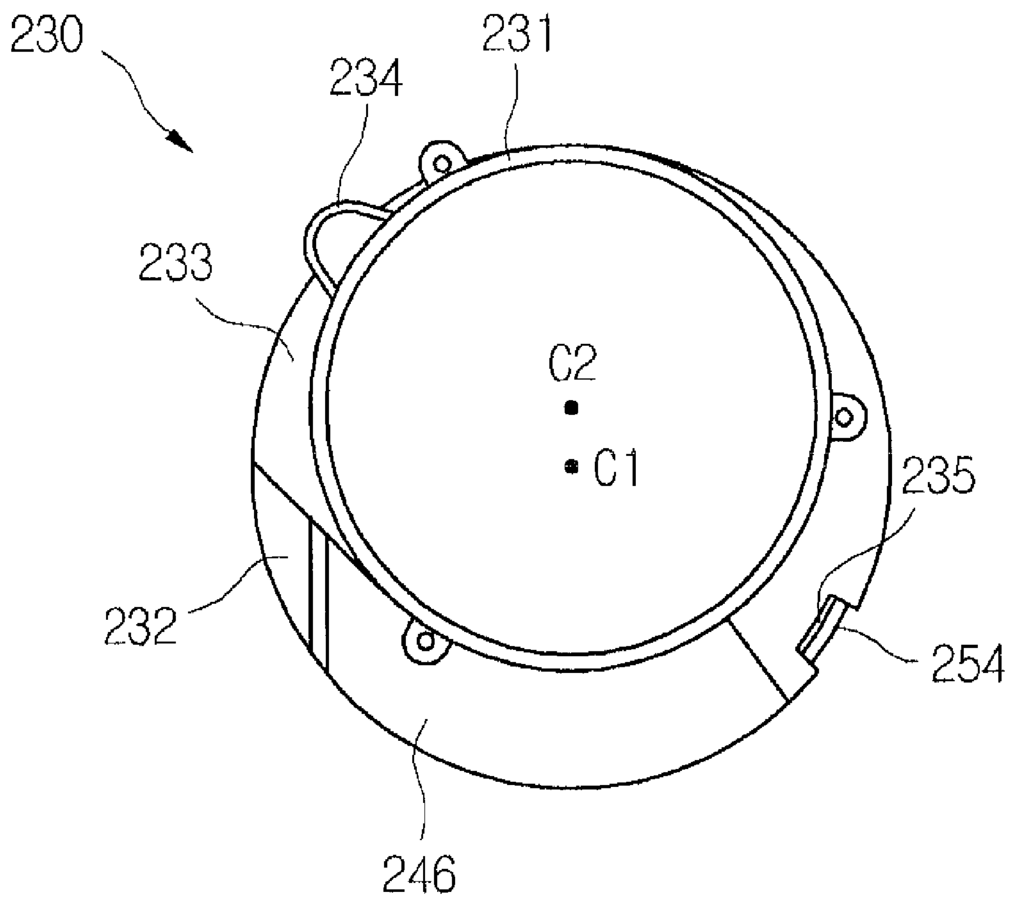
FIG. 9 is a plan view of the dust separation part.

FIGS. 7 and 8 are perspective views of the external appearance of the dust separation part, and FIG. 9 is a plan view of the dust separation part. Referring to FIGS. 7 to 9, the dust separation part 230 includes a first cyclone unit 231, the upper part and the lower part of which are opened, and a bottom part 232 forming a bottom of the first cyclone unit 231.

A division part 250 is rotatably coupled with the bottom part 232 of the dust separation part 230 and covers at least the first cyclone unit 231. The division part 250 divides the first cyclone unit 231 and the first dust storage part 214.

A suction port 233 is formed at the first cyclone unit 231 to inhale the air into an inside thereof. The suction port 233 is formed at a location corresponding to the first air inlet 218 formed at the dust collecting body 210. Therefore, the suction port 233 communicates with the first air inlet 218 when the dust separation part 230 is accommodated in the dust collecting body 210. The suction port 233 is formed to extend in at a tangential direction of the first cyclone unit 231 so that the inhaled air flows along an inner circumferential surface of the first cyclone unit 231.

The bottom part 232 extends in the horizontal direction from the first cyclone unit 231. An end of the bottom part 232 is rounded with a predetermined curvature, and an assumed line extending the curvature of the end of the bottom part 232, called "the assumed circle of the bottom part 232", has a circular shape. Further, a diameter of the assumed circle of the bottom part 232 corresponds to a diameter of the accommodation part 213 (shown in FIG. 4) of the dust collecting body 210. A diameter of the first cyclone unit 231 is shorter than that of the bottom part 232, since the bottom part 232 extends toward a lateral part of the first cyclone unit 231.

A center C2 of the first cyclone unit 231 is formed eccentrically with respect to a center C1 of the assumed circle of the bottom part 232 as illustrated in FIG. 9. More particularly, the first cyclone unit 231 is formed at a location having a common tangential line with the assumed circle of the bottom part 232. This allows the dust to flow smoothly along dust guide path 240 described hereinbelow.

First guide part 234 is formed in a lateral direction with respect to the first cyclone unit 231 to guide mounting of the dust separation part 230. A detailed description of the structure of the first guide part 234 has been omitted, since it is the same as the above description.

A plurality of coupling ribs 237 are formed at a top of the dust separation part 230 to couple the first cyclone unit 231, and a coupling hole 238 is formed at each of the coupling rib 237 to which a coupling member is coupled. When the dust separation part 230 is coupled with the cover member 270, the coupling rib 237 is located at the interval part formed between each of the coupling guides 276.

The dust guide path 240 is provided at the dust separation part 230 to guide the dust separated by the first cyclone unit 231 to fall downwardly after flowing inside inhaled in the tangential direction. The dust guide path 240 also performs as a guide for the separated dust to be discharged toward the tangential direction from the first cyclone unit 231.

More particularly, inlet 242 of the dust guide path 240 is formed at a lower side of the first cyclone unit 231. An outlet of the dust guide path 240 is formed at the division part 250.

That is, the division part 250 covers the assumed circle of the bottom part 232 and is formed to correspond to the assumed circle of the bottom part 232, and guides the dust inhaled into the dust guide path 240 to fall into the first dust storage part 214 through opening 252 formed at a location corresponding to an end of the dust guide path 240. The inlet 242 and the opening 252 have approximately the same size such that dust can smoothly pass through the inlet 242 and the opening 252.

A guide rib 245 is formed at the inlet 242 of the dust guide path 240 to guide the separated dust to be inhaled in the tangential direction of the first cyclone unit 231. The guide rib 245 extends in the tangential direction of the first cyclone unit 231 along an outside, and an end of the guide rib 245 reaches to an outer circumference of the bottom part 232.

A top part 246 forming the dust guide path 240 is formed vertically at the outside of the first cyclone unit 231 and extends toward the bottom part 232 around the opening 252 from the guide rib 245 around the inlet 242.

A width of the dust guide path 240 is the same as a width of the top part 246. Further, as the first cyclone unit 231 is formed eccentrically with respect to the assumed circle of the bottom part 232 as described above, it is possible for dust of a big volume to flow through the dust guide path 240 as the width of the dust guide path 240 is bigger than a predetermined size.

The top part 246 is curved downwardly closer to the opening 252 from the inlet 242 for smooth flow of the dust. Therefore, as the top part 246 is curved downwardly, a cross section of the dust guide path 240 becomes smaller as it extends closer to the opening 252 from the inlet 242. Even though the cross section of the dust guide path 240 becomes smaller as it extends closer to the opening 252 from the inlet 242, the dust is smoothly discharged through the opening 252, since the opening 252, the outlet of the dust guide path 240, is formed downwardly.

The division part 250 is rotated by a hinge 236 at the lower side of the dust separation part 230. That is, the hinge 236 is formed at a lower part of the first guide part 234. In this case, contact of the hinge 236 and an inner circumferential surface of the dust collecting body 210 is prevented, since the hinge 236 is arranged in the second guide part 215 when the dust separation part 230 is arranged in the dust collecting body 210.

A hook 254 extends upwardly at the division part 250 for the division part 250 to be coupled with the dust separation part 230. An engagement end 235 is formed at the bottom part 232 to be engaged with the hook 254.

Reference will now be made in detail to the dust separation process and the discharging process for the dust at the dust separation part 230.

The air inhaled into the first cyclone unit 231 through the suction port 233 is separated from the dust as it is rotated along the inner circumferential surface of the first cyclone unit 231. Further, the separated dust is discharged through the dust guide path 240 in the tangential direction. Further, the current direction of the dust inhaled into the dust guide path 240 is changed therein, and it is stored in the first dust storage part 214 as the separated dust falls downwardly through the opening 252.

Therefore, as the dust separated in the first cyclone unit 231 is discharged in the tangential direction of the first cyclone unit 231, that is, as the dust is discharged in the same direction as the direction that the dust is rotated, both the dust of relatively higher density and the dust of relatively lower density are easily discharged from the first cyclone unit 231.

It is advantageous in that dust separation efficiency is improved as the air flows smoothly as the dust of lower density is not piled up at the filter member 280 and is easily discharged. Further, it is advantageous that scattering of the dust stored in the first dust storage part 214 and a reverse-flow of the dust to the first cyclone unit 231 are prevented, as the dust inhaled into the dust guide path 240 is discharged into the first dust storage part 214, since the flowing direction of the dust is changed in the dust guide path 240. That is, the reverse-flow of the dust stored in the first dust storage part 214 is prevented, since the flowing direction of the dust flowing backwardly through the dust guide path 240 is opposite to the direction of the flowing direction of the dust inhaled into the dust guide path 240.

Figure 10:
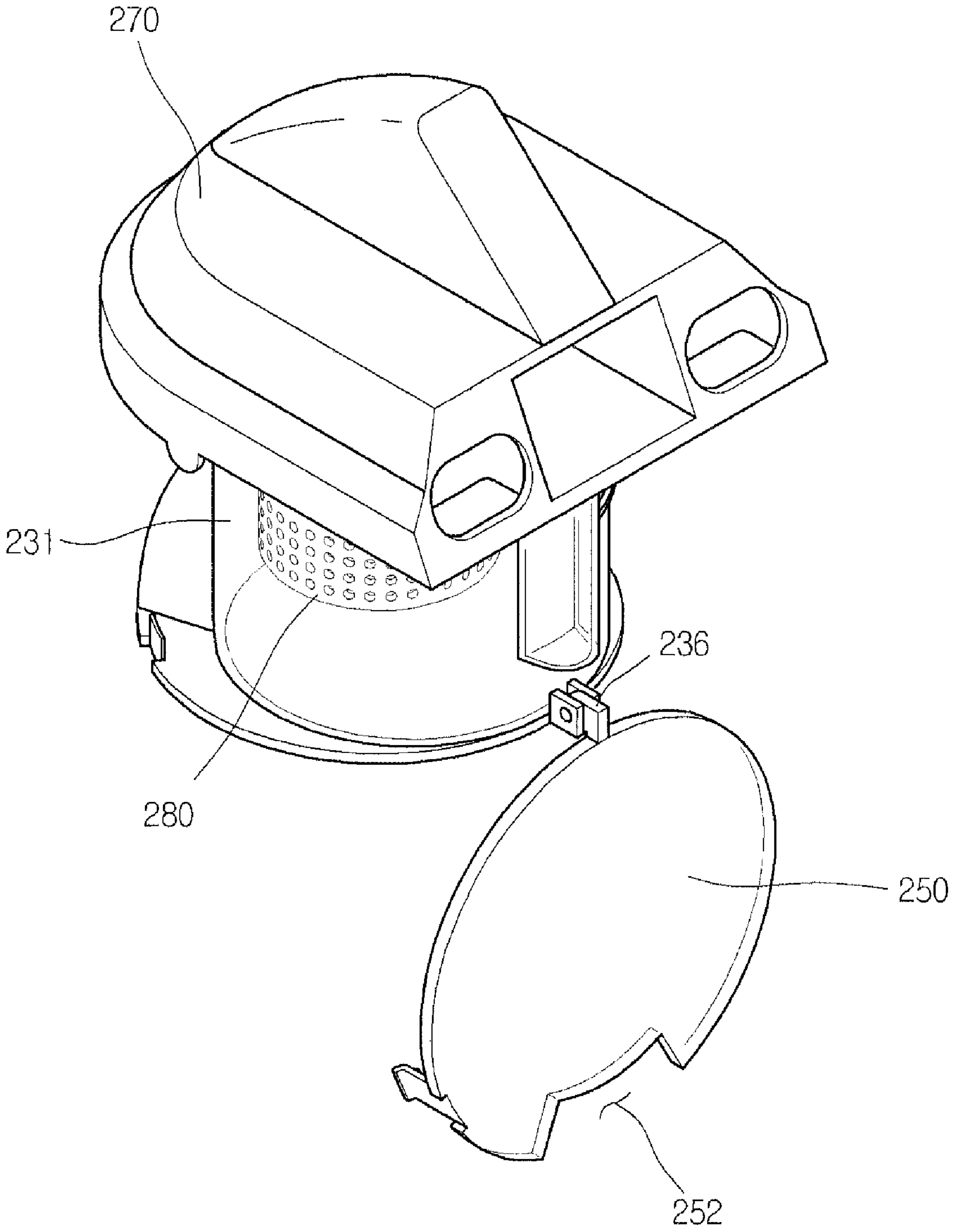
FIG. 10 is a perspective view illustrating a division part toward a lower side of the dust separation part.

FIG. 10 is a perspective view illustrating the division part rotated toward the lower side of the dust separation part. Referring to FIG. 10, the filter member 280 is located in the first cyclone unit 231 when the filter member 280 is coupled with the cover member 270.

The dust separation part 230 is coupled securely at the lower side of the cover member 270. The filter member 280 is coupled with or separated from the cover member 280 at the lower side of the first cyclone unit 231.

More particularly, the division part 250 is rotated downward with respect to the dust separation part 230 for coupling or separation of the filter member 280. Then, the lower side of the first cyclone unit 231 is opened. Further, the filter member 280 is coupled or separated through the opened part of the first cyclone unit 231.

It is possible for a user to couple or separate the filter member 280 with or from the cover member 270 easily as the division part 250 formed at the dust separation part 230 is rotated, and the filter member 280 is formed to be attached and separated to and from the cover member 270 through the open lower part of the first cyclone unit 231. That is, it is possible for the filter member 280 to be coupled and separated by rotating the division part 250 without separating the dust separation part 230 from the cover member 270.

Figure 11:
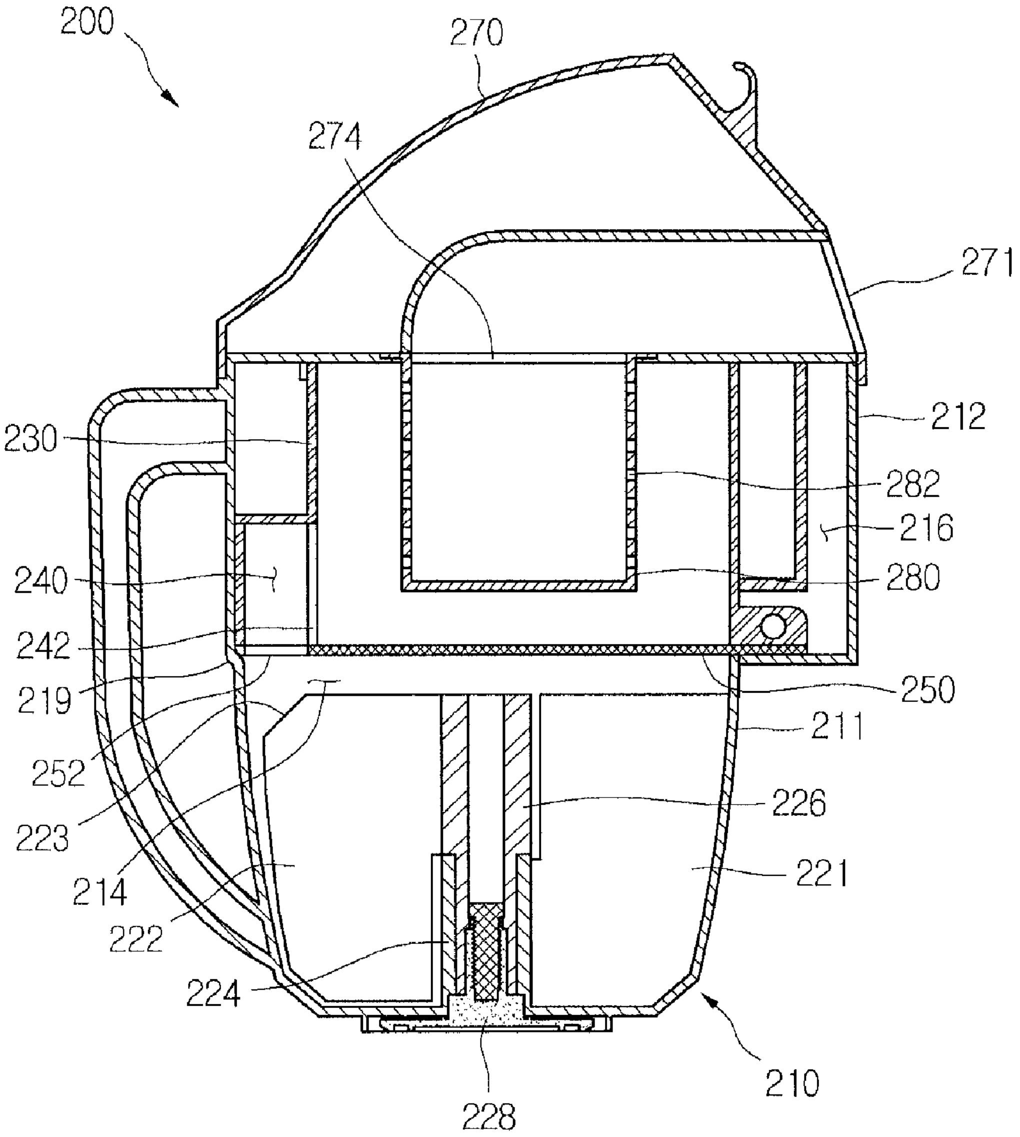
FIG. 11 is a cross-sectional view, taken along the line I-I' in FIG. 3.

FIG. 11 is a cross-sectional view, taken along the line I-I' of FIG. 3. Referring to FIG. 11, a pair of compressing members 221 and 222 is arranged in the dust collecting body 210 to increase the dust collecting capacity by reducing a volume of the dust stored in the first dust storage part 214. The pair of compressing members 221 and 222 reduces the volume of the dust due to an interaction with each other, and accordingly, increases a maximum dust collecting capacity of the first dust storage part 214 by increasing the density of the dust stored in the first dust storage part 214.

More particularly, the pair of compressing members 221 and 222 includes a first compressing member 221 fixed at a fixed shaft 224 that protrudes at the bottom of the dust collecting body 210, and a second compressing member 222 fixed at a rotating shaft 226 coupled with the fixed shaft 224. That is, the first compressing member 221 is a fixed member, and the second compressing member 222 is a rotating member.

A driven gear 228 rotated by power from outside is coupled with the rotating shaft 226. Though not illustrated, an operation gear geared with the driven gear 228 and an operation motor that operates the operation gear are arranged in the main body 100. When the operation motor is operated, the operation gear and the driven gear 228 are rotated, and the second compressing member 222 is rotated by the rotation of the driven gear 228.

It is preferable for the second compressing member 222 to be rotated in both directions to compress the dust at both sides of the first compressing member 221, and accordingly, a synchronous motor can be used as the operation motor. In this preferred embodiment, at least one of the pair of compressing members 221 and 222 is arranged in the dust collecting body 210 to be rotated, but it is possible that both of the compressing members 221 and 222 be arranged in the dust collecting body 210 to be rotated.

It is preferable for the first compressing member 221 to be located at an opposite side of the opening 252 with respect to a central axis of the dust collecting body 210 so as not to disturb the falling of the dust stored in the first dust storage part 214 through the opening 252 by the first compressing member 221. Further, it is preferable that a chamfer 223 chamfered with a predetermined angle is formed at an upper end of the second compressing member 222. The chamfer 223 lets the dust be discharged easily through the opening 252 by forming a space between the opening 252 and the second compressing member 222 when the upper end of the second compressing member 222 is located at the lower side of the opening 252.

Reference will now be made in detail to operation of a vacuum cleaner.

First, suction pressure is generated when power is applied to the suction motor of vacuum cleaner 10, and the suction pressure inhales air including dust through the suction nozzle. The air inhaled through the suction nozzle is inhaled into the main body 100 through the main body suction port 110, and the inhaled air is inhaled into the dust collector 200 after passing through a predetermined path.

More particularly, the air including the dust is inhaled in the tangential direction of the first cyclone unit 231 through the first air inlet 218 of the dust collector 210. Then, the inhaled air falls down as it is rotated along the inner circumferential surface of the first cyclone unit 231, and the air and the dust are separated from each other by centrifugal force due to differences in weight in this process.

Further, the air separated from dust is discharged to an outside of the dust collector 200 through the ejecting hole 274 and the first air outlet 271 after being filtered through the holes 282 of the filter member 280. The separated dust is inhaled into the dust guide path 240 in the tangential direction and flows along the inner circumferential surface of the first cyclone unit 231.

Then, the flowing direction of the dust inhaled into the dust guide path 240 is changed in the dust guide path 240, and the dust is stored in the first dust storage part 214 after falling down through the opening 252. On the other hand, the air exhausted through the first air outlet 271 is inhaled into the main body 100. Then, the air inhaled into the main body 100 is inhaled into the second cyclone unit 300 after passing through the connection path 114.

The air is directed toward each of the tangential direction on the inner wall of the second cyclone unit 300 through the second air inlet (not shown) connected to an end of the connection path 114, and is separated from dust once more as it is rotated therein. Further, the air separated from dust once more is inhaled into the main body 100. Then, the air inhaled into the main body 100 is discharged to the outside through the main body outlet port formed at a side of the main body 100 after passing through the suction motor.

On the other hand, the separated dust in the second cyclone unit 300 is inhaled into the dust collector 200 through the dust inlet 272, and is finally stored in the second dust storage part 216. The dust is separated from the air and is stored in the dust storage part, and the pair of compressing members 221 and 222 compresses the dust stored in the first dust storage part 214.

What is claimed is:

1. A dust collector of a vacuum cleaner, comprising:

a dust separation part that separates dust from air;

a dust collecting body having a dust storage part that stores the dust separated by the dust separation part; and a division part that closes the dust separation part and includes an opening through which the dust is discharged into the dust storage part, wherein the dust collecting body is provided as a separate component to the dust separation part, and the dust separation part is received in the dust collecting body, wherein the division part is coupled to the dust separation part and is rotated by a hinge provided at a lower side of the dust separation part, wherein the dust collecting body comprises an air inlet through which air is inhaled, and the dust separation part comprises a suction port, through which air including the dust is sucked into the dust separation part, and wherein the suction port is formed at a location corresponding to a position of the air inlet formed in the dust collecting body when the dust separation part is disposed in the dust collecting body.

2. The dust collector according to claim 1, wherein a hook is formed on the division part and an engagement end that performs an engagement operation with the hook is formed on the dust storage part.

3. The dust collector according to claim 1, wherein the dust separation part includes a cyclone device that separates the dust by operation of a cyclone and a bottom part that forms a bottom of the cyclone device and extends horizontally from the cyclone device.

4. The dust collector according to claim 3, wherein an upper part and a lower part of the cyclone device are open, and wherein the lower part of the cyclone device is closed by the division part.

5. The dust collector according to claim 3, wherein the dust separation part includes a dust guide path that discharges the separated dust in a tangential direction from the cyclone device, and guides the discharged dust to be discharged into the dust storage part.

6. The dust collector according to claim 1, further comprising a cover member that closes the dust collecting body, wherein the dust separation part is fixed to the cover member.

7. The dust collector according to claim 6, further comprising a filter member arranged in the dust separation part and coupled with the cover member.

8. The dust collector according to claim 1, wherein a first guide part is formed on the dust separation part and a second guide part is formed on the dust collecting body, and wherein the first guide part is received in the second guide part when the dust separation part is located within the dust collecting body.

9. A dust collector of a vacuum cleaner, comprising:

a dust collecting body having a dust storage part that stores dust;

a dust separation part located inside of the dust collecting body that separates the dust from air;

a division part having an opening that moves the separated dust to the dust storage part;

a cover member coupled with the dust separation part that closes the dust collecting body; and a filter member located inside of the dust separation part that is coupled with the cover member, wherein the dust collecting body is provided as a separate component to the dust separation part, and the dust separation part is received in the dust collecting body, wherein the division part is coupled to the dust separation part and is rotated by a hinge provided at a lower side of the dust separation part, wherein a first guide part is formed on the dust separation part, and a second guide part is formed on the dust collecting body, and wherein the first guide part is received in the second guide part when the dust separation part is located within the dust collecting body.

10. The dust collector according to claim 9, wherein the dust separation part includes a cyclone device that separates the dust from inhaled air by operation of a cyclone.

11. The dust collector according to claim 9, further comprising:

a fixed member that is fixed to the dust collecting body; and a compressing member that reduces a volume of the dust stored in the dust storage part due to an interaction with the fixed member, wherein the compressing member is fixed to a rotating shaft.

12. The dust collector according to claim 11, wherein the fixed member is located at an opposite side of the opening of the division part with respect to a central axis of the dust collecting body.

13. A dust collector of a vacuum cleaner, comprising:

a dust separation part that separates dust from air;

a dust collecting body having a dust storage part that stores the dust separated by the dust separation part; and a division part that closes the dust separation part and includes an opening through which the dust is discharged into the dust storage part, wherein the division part is coupled to the dust separation part and is rotated by a hinge provided at a lower side of the dust separation part, and wherein the dust separation part includes a cyclone device that separates the dust by operation of a cyclone, and a bottom part that forms a bottom of the cyclone device and extends horizontally from the cyclone device.

14. The dust collector according to claim 13, wherein an upper part and a lower part of the cyclone device are open, and wherein the lower part of the cyclone device is closed by the division part.

15. The dust collector according to claim 13, wherein the dust separation part includes a dust guide path that discharges the separated dust in a tangential direction from the cyclone device, and guides the discharged dust to be discharged into the dust storage part.

16. The dust collector according to claim 1, wherein the dust collecting body comprises an accommodating portion configured to receive the dust separation part disposed therein.

17. The dust collector according to claim 16, wherein the accommodation portion includes a bent portion that supports the dust separation part when the dust separation part is disposed in the dust collecting body.

* * * * *